United States Patent
Caston

(10) Patent No.: US 9,802,301 B2
(45) Date of Patent: Oct. 31, 2017

(54) MULTI-HEAD RACK AND PINION DRIVEN PULLEY PULLER

(71) Applicant: David Caston, Knoxville, TN (US)

(72) Inventor: David Caston, Knoxville, TN (US)

( * ) Notice: Subject to any disclaimer, the term of this patent is extended or adjusted under 35 U.S.C. 154(b) by 0 days.

(21) Appl. No.: 15/095,847

(22) Filed: Apr. 11, 2016

(65) Prior Publication Data
US 2016/0311095 A1 Oct. 27, 2016

Related U.S. Application Data

(60) Provisional application No. 62/151,040, filed on Apr. 22, 2015.

(51) Int. Cl.
*B25B 27/02* (2006.01)
*B25B 27/06* (2006.01)
*F16H 19/04* (2006.01)

(52) U.S. Cl.
CPC ............ *B25B 27/02* (2013.01); *B25B 27/062* (2013.01); *F16H 19/04* (2013.01); *Y10T 29/53796* (2015.01)

(58) Field of Classification Search
CPC .......... B23P 19/04; B25B 27/02–27/06; B25B 5/067; B25B 5/082; B25B 5/101; B25B 5/125
See application file for complete search history.

(56) References Cited

U.S. PATENT DOCUMENTS

| | | | |
|---|---|---|---|
| 196,811 A | 11/1877 | Kirkwood | |
| 698,311 A | 4/1902 | Mcphee | |
| 1,448,597 A | 3/1923 | Pitzer | |
| 1,468,976 A * | 9/1923 | Rickart | B25B 27/0035 29/264 |
| 1,709,913 A | 4/1929 | Kaplan | |
| 1,787,016 A * | 12/1930 | Opel | B25B 27/02 29/261 |
| 1,826,908 A * | 10/1931 | Wainwright | B25B 27/26 29/215 |
| 2,452,457 A * | 10/1948 | Gray | B25B 27/02 254/18 |
| 2,535,719 A | 12/1950 | Blind | |
| 2,750,025 A | 6/1956 | Nichta | |
| 3,427,016 A * | 2/1969 | Harris | B25B 5/068 269/214 |

(Continued)

FOREIGN PATENT DOCUMENTS

| CN | 2803639 | | 8/2006 |
|---|---|---|---|
| CN | 2803639 Y | * | 8/2006 |

(Continued)

OTHER PUBLICATIONS

Patent Cooperation Treaty; Int'l Search Report & Written Opinion, Form PCT/ISA/220 dated (Jul. 2014).

*Primary Examiner* — Larry E Waggle, Jr.
*Assistant Examiner* — Tyrone V Hall, Jr.
(74) *Attorney, Agent, or Firm* — Pitts & Lake, P.C.

(57) ABSTRACT

A multi-head, rack and pinion driven pulley puller including a rack and pinion drive assembly. The drive assembly includes a body member, a rack shaft, and a pinion gear, enclosed in the body member in one embodiment. The drive assembly further has a head that is adapted to receive a variety of puller assemblies, including a pivoting jaw puller assembly and a forked plate puller assembly.

17 Claims, 9 Drawing Sheets

(56) References Cited

U.S. PATENT DOCUMENTS

| | | | |
|---|---|---|---|
| 4,354,375 A * | 10/1982 | Lesowsky | B25B 27/0007 |
| | | | 254/95 |
| 5,174,005 A | 12/1992 | Somerville | |
| 5,557,833 A | 9/1996 | Pool | |
| 6,036,691 A | 3/2000 | Richardson | |
| 6,266,860 B1 | 7/2001 | Kiebler | |
| 6,340,363 B1 | 1/2002 | Bolger | |
| 6,665,918 B1 | 12/2003 | Williams | |
| 7,007,359 B2 | 3/2006 | Wilson | |
| 7,011,658 B2 | 3/2006 | Young | |
| 7,216,409 B1 * | 5/2007 | Chiu | B25B 27/023 |
| | | | 29/255 |
| 7,927,337 B2 | 4/2011 | Keller | |
| 8,015,683 B2 | 9/2011 | Hume | |
| 2004/0216291 A1 | 11/2004 | Abrahamson | |
| 2005/0126000 A1 * | 6/2005 | Hadayia, Jr. | B25B 27/0028 |
| | | | 29/888.01 |
| 2007/0018144 A1 | 1/2007 | Saavedra | |
| 2009/0139071 A1 * | 6/2009 | Palka | B25B 27/02 |
| | | | 29/259 |

FOREIGN PATENT DOCUMENTS

| | | |
|---|---|---|
| EP | 256061 | 11/1991 |
| EP | 2241405 | 10/2010 |
| EP | 2241406 | 10/2010 |
| EP | 2110573 | 10/2011 |
| JP | 2001162551 A * | 6/2001 |
| SU | 1630797 | 2/1991 |
| WO | WO9302428 | 12/1993 |

* cited by examiner

MULTI-HEAD RACK AND PINION DRIVEN PULLEY PULLER

CROSS-REFERENCE TO RELATED APPLICATIONS

This application claims the benefit of U.S. Provisional Patent Application No. 62/151,040 filed on Apr. 22, 2015, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a pulley puller. More particularly, it relates to a multi-head, rack and pinion driven pulley puller that has particular usefulness in applications with minimal clearance or minimal access to a pulley.

2. Description of the Related Art

In the art of pulleys, particularly pulleys used in conjunction with belt-driven equipment, it is known that a pulley must frequently be removed from a pulley shaft. In this regard, many belt-driven types of equipment utilize a pulley on a shaft for receiving belt-driven power, the shaft may turn a piece of equipment, or may have an additional pulley for redirecting the rotational force, via a secondary belt, in another direction. Typically, there is a bearing assembly in conjunction with the shaft and pulley(s) which is subject to wear, fatigue, and replacement. Further, it is known that pulleys are often used in conjunction with keyed shafts, a key and cooperating slot being utilized to prevent unwanted slip between the pulley and the shaft. It is known, generally, that force must often be used in the removal of the pulley from the shaft due to conditions including repeated usage, tight tolerances between pulley and shaft creating a tight friction fit, and frequently, the need to remove a pulley from a shaft that is heated through use. However, those skilled in the art will recognize that, due to space constraints, it is often difficult to apply force. Moreover, typical pulley pullers often require a large amount of space around the pulley for placement of known, prior art pulley pullers.

One such example of belt driven equipment that utilizes numerous pulley/shaft/bearing assembly combinations are the mail sorters typically utilized by the postal service. In this regard, pieces of mail, i.e. envelopes, are propelled by pulley-driven belts through various modules, including, without limitation reader modules and stacker modules through a plurality of gates which direct the path of individual pieces of mail into a specific pocket depending upon its destination. Those skilled in these arts will recognize that modern mail sorters handle between 30 and 36 thousand pieces of mail per hour, propelling the individual envelopes at speeds of approximately 154 inches per second. These stacker modules contain multiple pulley/bearing assembly combinations, and, as the common name suggests are often stacked on one another creating very tight spacing in which to work on such pulleys for maintenance purposes. And, it will be appreciated that it is very important to minimize down-time when it is necessary to do maintenance on various pulleys.

And, there are a number of different types of pulley pullers known in the art. For instance, U.S. Pat. No. 1,709,913 issued to Kaplan on Apr. 23, 1929, describes a gear puller comprising a block with a pair of jaws pivotally connected to the block and a jack screw threadably mounted in the block. The jack screw is turned and applies a force to the shaft that the gear or pulley is mounted on in order to pull the gear or pulley off of the shaft. Similarly, U.S. Pat. No. 4,084,305, issued to Chang on Apr. 18, 1978, and U.S. Pat. No. 6,665,918 issued to Williams on Dec. 23, 2003 disclose pulley pullers that are also actuated by a jack screw, or thrust bolt, which serves to drive the hub and attached jaws, or arms away from a shaft on which a pulley is mounted. Kiebler, in U.S. Pat. No. 6,266,860, issued on Jul. 31, 2001, discloses a different structure for engaging a pulley, but also relies on a jack screw to drive the puller away from a shaft on which a pulley is mounted. U.S. Pat. No. 7,927,337 issued to Keller on Apr. 19, 2011, discloses a bone spreader, in the medical arts, that utilizes a rack and pinion to move two spreader bodies either towards or away from each other.

What is missing from the art is a pulley puller that is actuated by a rack and pinion drive allowing for more rapid adjustment than typical jack-screw actuated pulley pullers. Further, missing from the prior art is a rack and pinion driven pulley puller that is adapted to have interchangeable heads allowing for accessing pulleys in a variety of environments.

BRIEF SUMMARY OF THE INVENTION

The multi-head, rack and pinion driven pulley puller of the present invention comprises a rack and pinion driven drive assembly. The drive assembly includes a body member, a rack shaft, and a pinion gear, enclosed in the body member in one embodiment. The drive assembly, in an exemplary embodiment, further includes a ratcheting pawl, carried by the body member to prohibit unintended reverse motion of the rack shaft. The drive assembly includes in one embodiment a drive port for receiving a tool, such as a hex key, often referred to as an Allen wrench, for driving the pinion gear. In a further embodiment, rotational force could be supplied to the pinion gear by a knob. The drive assembly further has a head that is adapted to receive a variety of puller assemblies. In an exemplary embodiment, the head is carried by the body member and the rack driven shaft moves longitudinally through the head. In an exemplary embodiment, a puller assembly consists of a pivoting jaw member mounted on the head and a shaft extension received by the rack shaft. The pivoting jaw head includes at least two jaw members that grasp a pulley, while the rack shaft, and an optional shaft extension, apply force to a shaft so as to separate a pulley from the shaft on which it is mounted. A second puller assembly includes a pair of fork plates. In this regard, the first fork plate is mounted on the head while the second forked plate member is carried by the distal end of the rack shaft. In one embodiment, the second forked plate is eliminated and the distal end of the shaft engages the deck plate. Actuation of the drive assembly drives the forked plate members away from each other. In this regard, the first fork member engages a pulley on a shaft while the other forked plate member bears against a deck plate. This allows the pulley puller to access the pulley in minimal clearance areas where it may be difficult to engage the pulley with a traditional pivoting jaw, jack-screw driven pulley puller.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
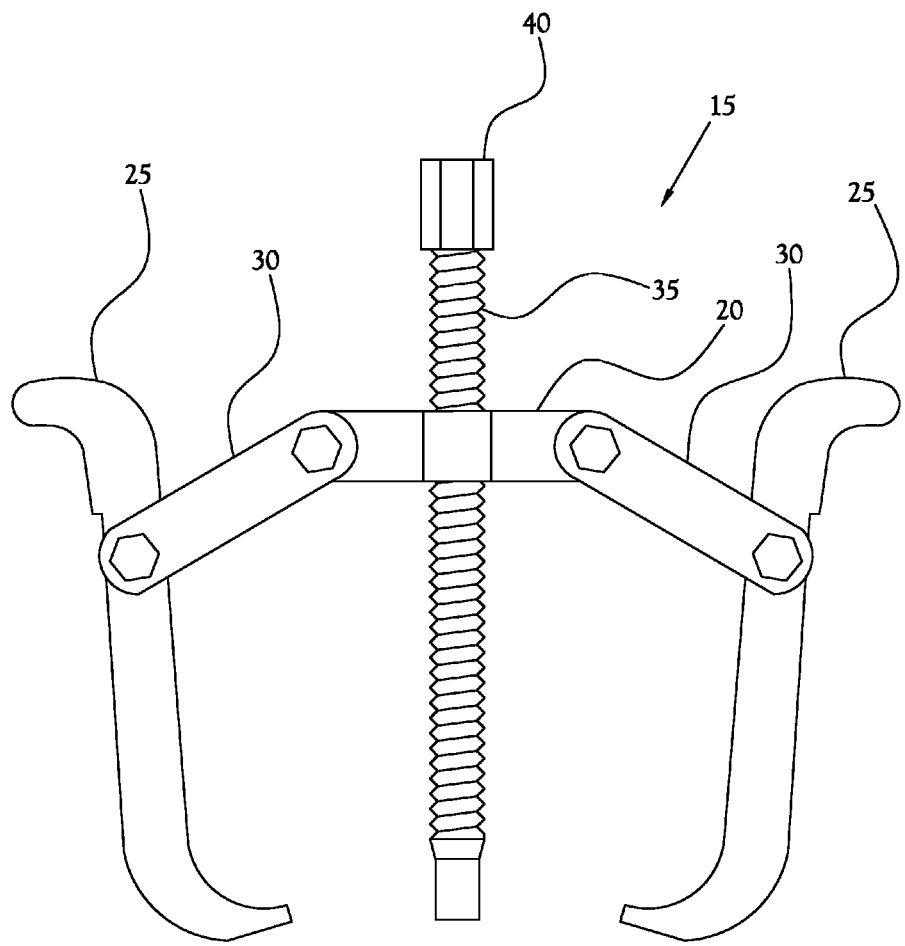
FIG. 1 is an elevation view of a prior art pulley puller.

FIG. 1 illustrates a prior art pulley puller 15. Those skilled in the art will recognize that the prior art pulley puller 15 includes a body 20, a pair of jaw members 25 having a pivotal linkage 30, and a jack screw 35. The jack screw 35 of the illustrated prior art pulley puller 15 includes a hexagonal head 40 that cooperates with a wrench (not show) which rotatably actuates the prior art pulley puller 15. Those skilled in the art will recognize that depending upon the thread count, or thread pitch, it can take significant rotation of the jack screw 35 to pull a pulley the distance required to remove the pulley from a shaft. Further, environmental considerations, such as the space between a pulley and a deck plate may make use of this type of pulley puller difficult, or simply not possible.

Figure 2:
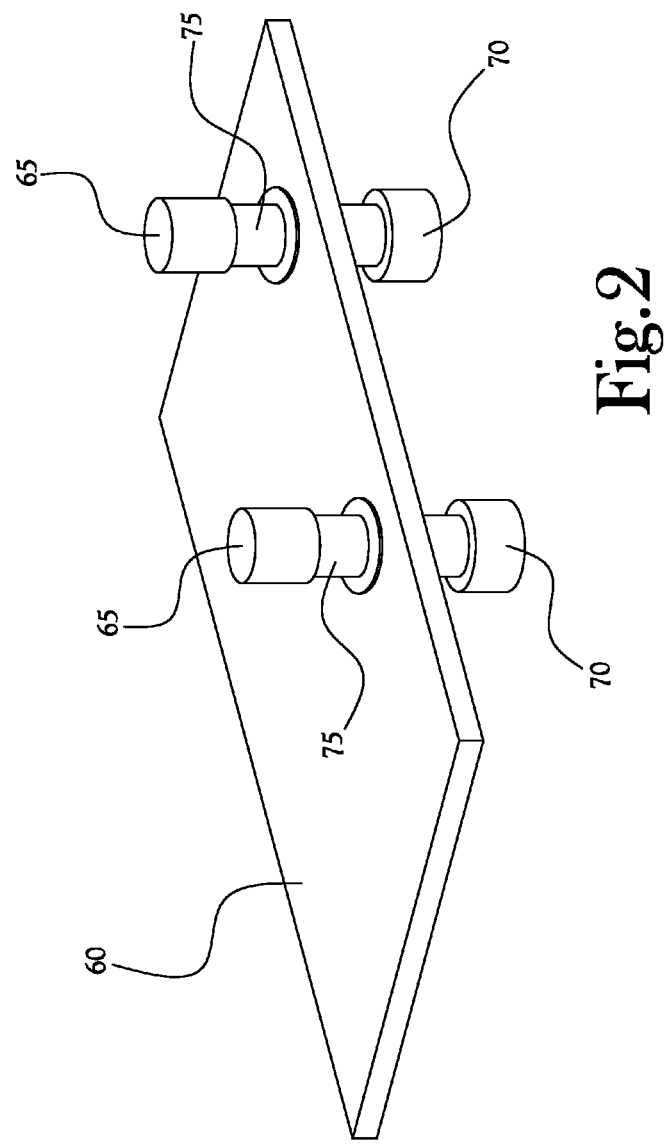
FIG. 2 is a side elevation view showing a mock-up of the environment that various pulleys can be found in with relation to a deck plate.
Figure 3:
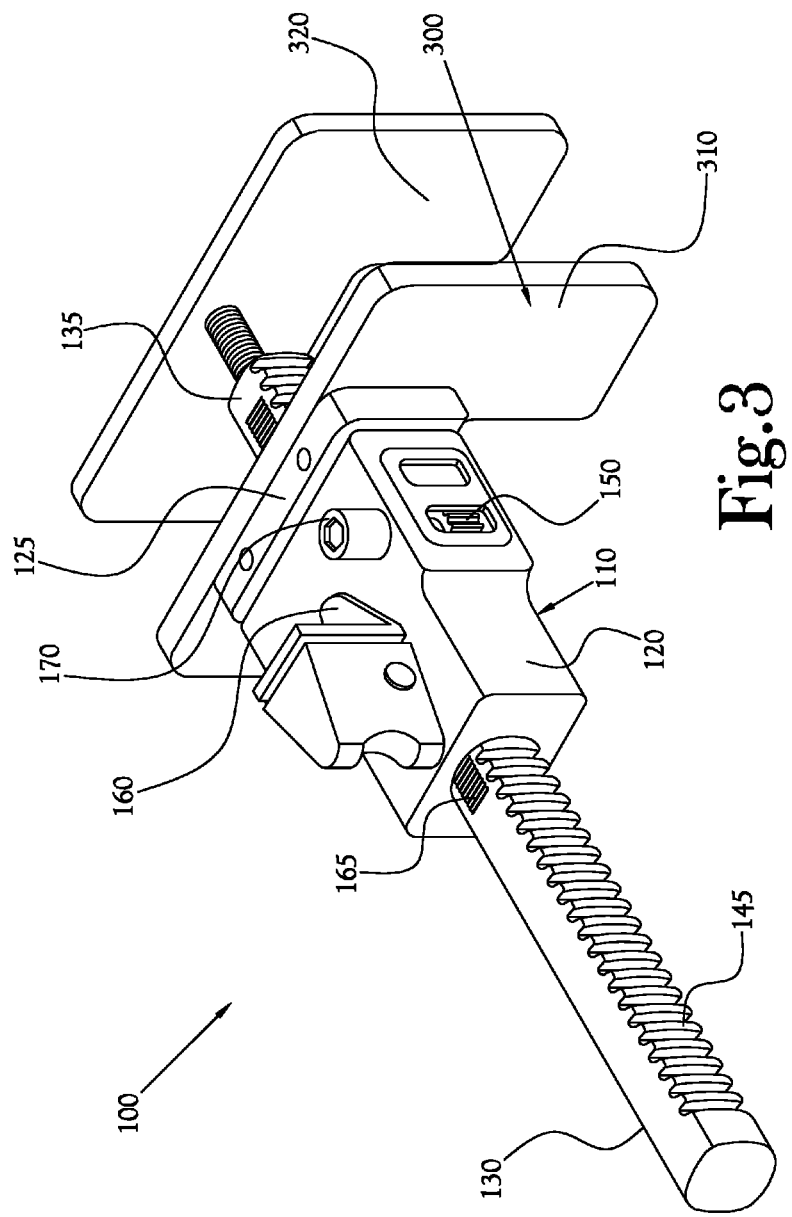
FIG. 3 is a perspective view of an exemplary embodiment of the multi-head rack and pinion driven pulley puller of the present invention.
Figure 4:
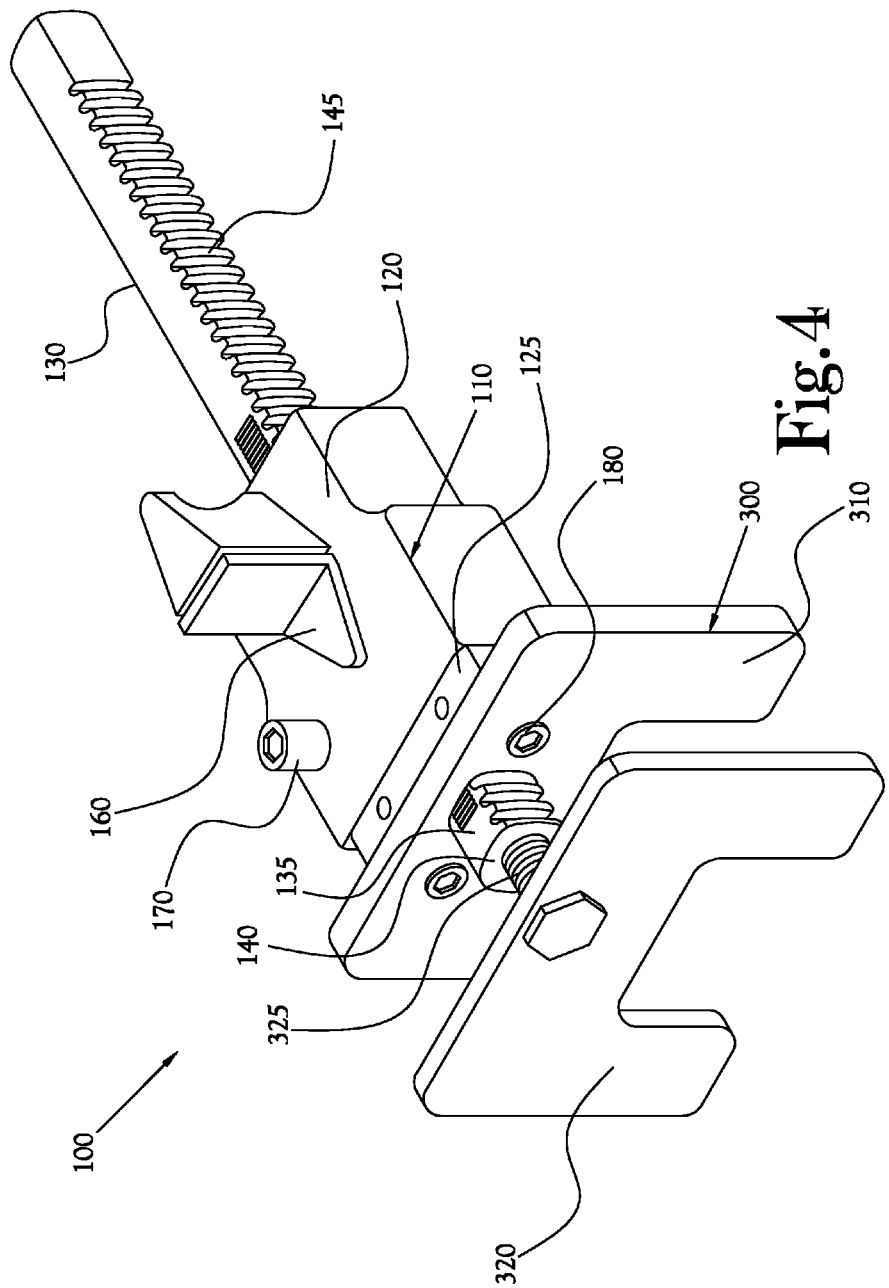
FIG. 4 is a further perspective view of the embodiment of the exemplary multi-head rack and pinion driven pulley puller illustrated in FIG. 3.
Figure 5:
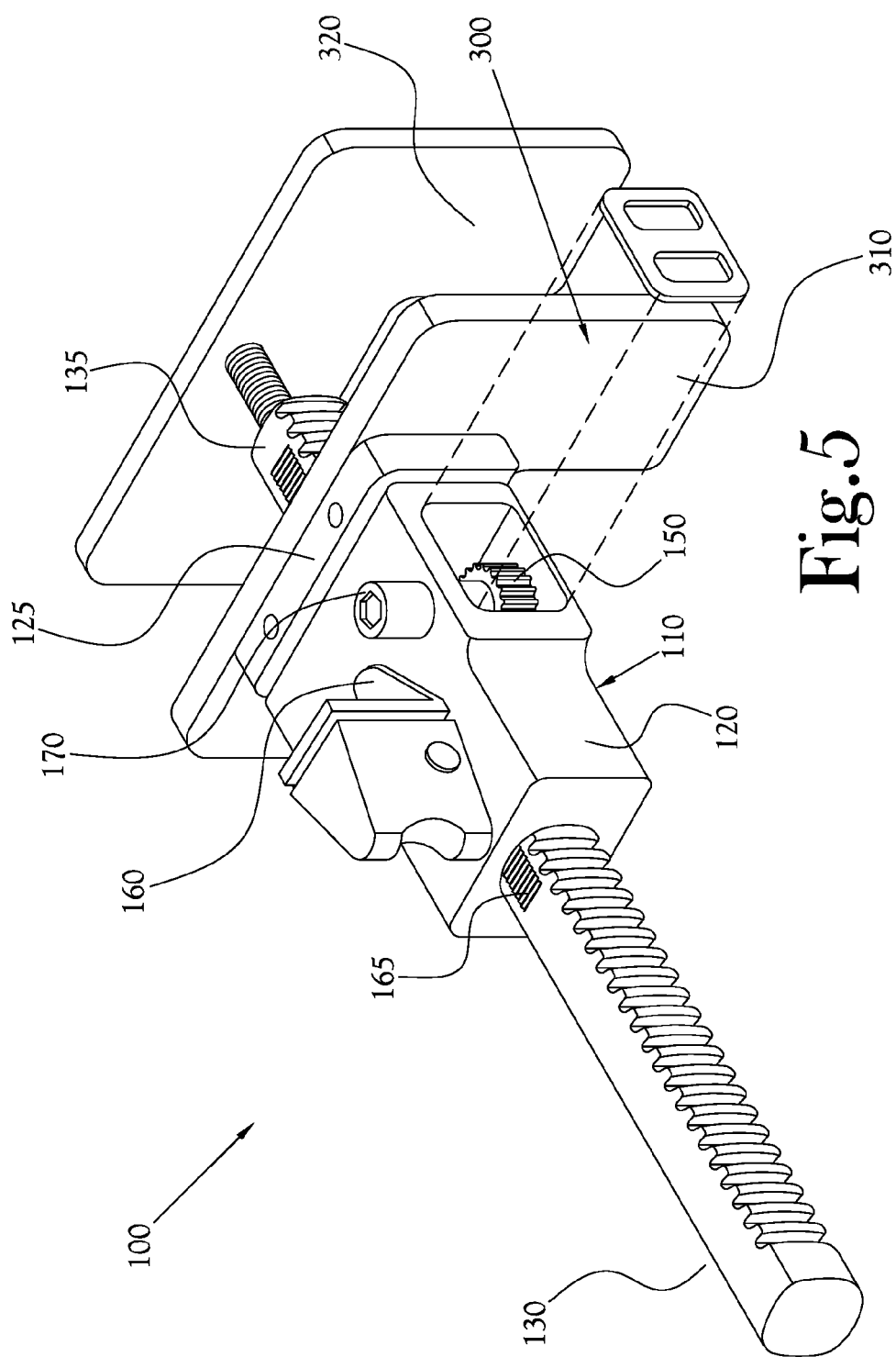
FIG. 5 is a further perspective view of the embodiment of the multi-head rack and pinion driven pulley puller illustrated in FIG. 3.
Figure 6:
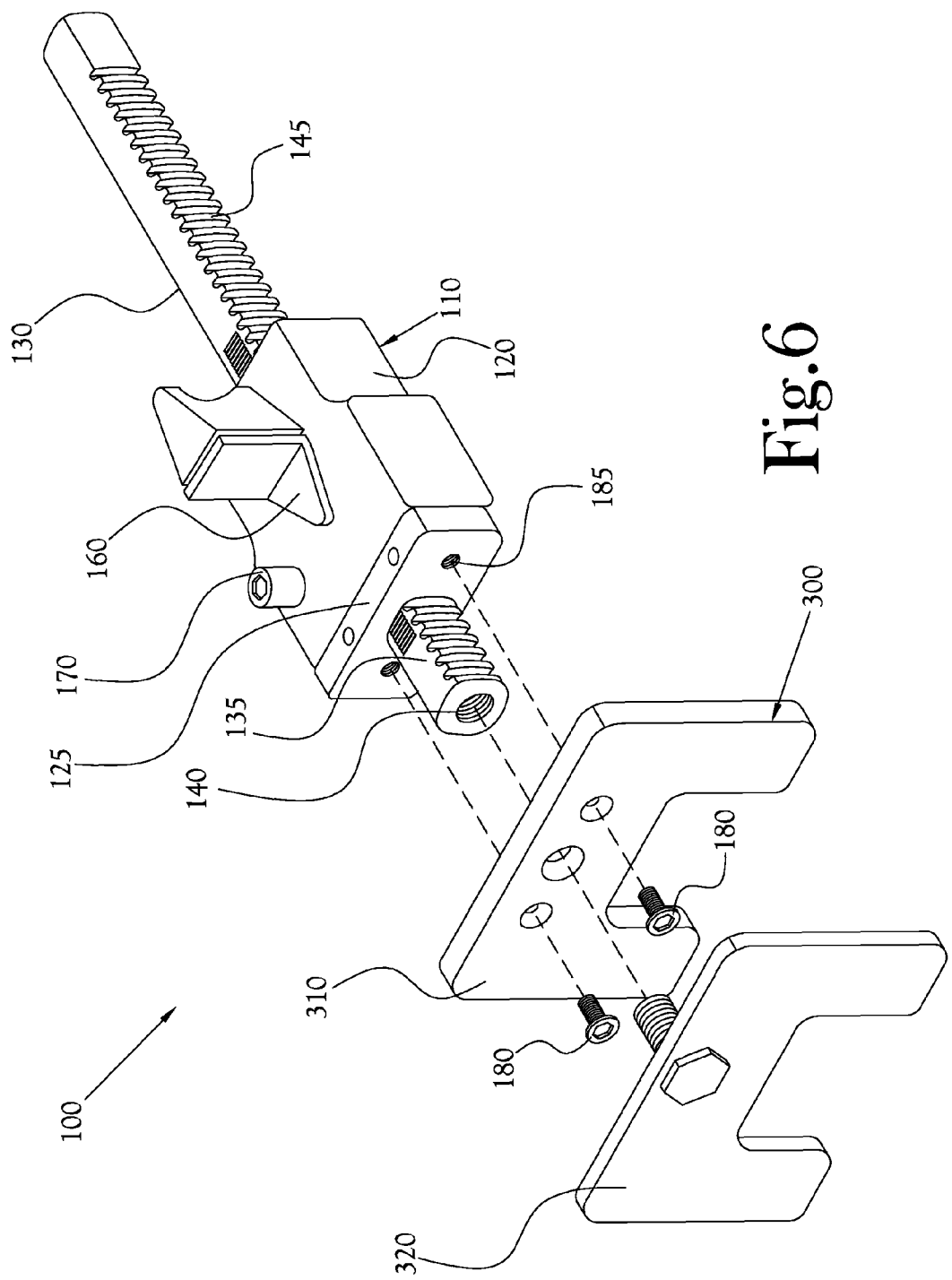
FIG. 6 is an exploded perspective view of the embodiment of the multi-head rack and pinion driven pulley puller illustrated in FIG. 3.

FIG. 2 illustrates one scenario that can present itself, especially with regard to various types of mail sorting apparatus. It will be recognized that a deck plate 60 can carry a plurality of pulleys, such as upper pulley 65 which, for example can drive the webbing (not shown) that propels pieces of mail, lower pulley 70 which receives rotational force from a drive belt (not shown), and a bearing assembly 75 located there between. In accordance with an exemplary embodiment, the multi-head, rack and pinion driven pulley puller 100 is adapted to receive at least two different types of pulley pulling assemblies to allow easy, quick, and efficient access to both upper pulleys 65 and lower pulleys 70 and can be provided as a kit featuring the drive assembly 110 and various pulley puller assemblies.

In this regard, multi-head, rack and pinion driven pulley puller 100 of the present invention comprises a rack and pinion driven drive assembly 110 adapted to receive a variety of puller assemblies, such as, though not limited to pivoting jaw puller assembly 200 or forked plate puller assembly 300, each of which, according to an exemplary embodiment of the present invention is adapted to be mounted on the rack and pinion drive assembly 110.

The drive assembly 110 includes a body member 120, a rack shaft 130 having an upper end 135, and a pinion gear 150, enclosed in the body member 120 in one embodiment. The drive assembly 110, in an exemplary embodiment, further includes a ratcheting pawl 160, carried by the body member 120 to prohibit unintended reverse motion of the drive. In this regard, in an exemplary embodiment, rack shaft 130 is provided with a section of locking teeth 165 which cooperate with the ratcheting pawl 160. The drive assembly 110 further includes, in one embodiment, a drive port 170 adapted for providing a rotational force to the pinion gear 150. In an exemplary embodiment, drive port 170 is adapted for receiving a tool (not shown), such as a hex key, often referred to as an Allen wrench, for driving the pinion gear 150. In a further embodiment, rotational force could be supplied to the pinion gear 150 by a knob (not shown). It will be appreciated that by selecting the spacing, or pitch, of the gear teeth 145 on rack shaft 130, and the gear ratio of the pinion gear 150, one can select the torque and the distance that the rack shaft 130 travels per turn of revolution of the drive port 170. In an exemplary embodiment, the rack shaft 130 travels 1⅝" per revolution of the drive port 170.

The body member 120 further has a head 125 that is adapted to receive a variety of puller assemblies, such as pivoting jaw puller assembly 200 or forked plate puller assembly 300. In an exemplary embodiment, the head 125 defines the upper portion of the body member 120 and the rack shaft 130 moves longitudinally through the head 125.

Figure 7:
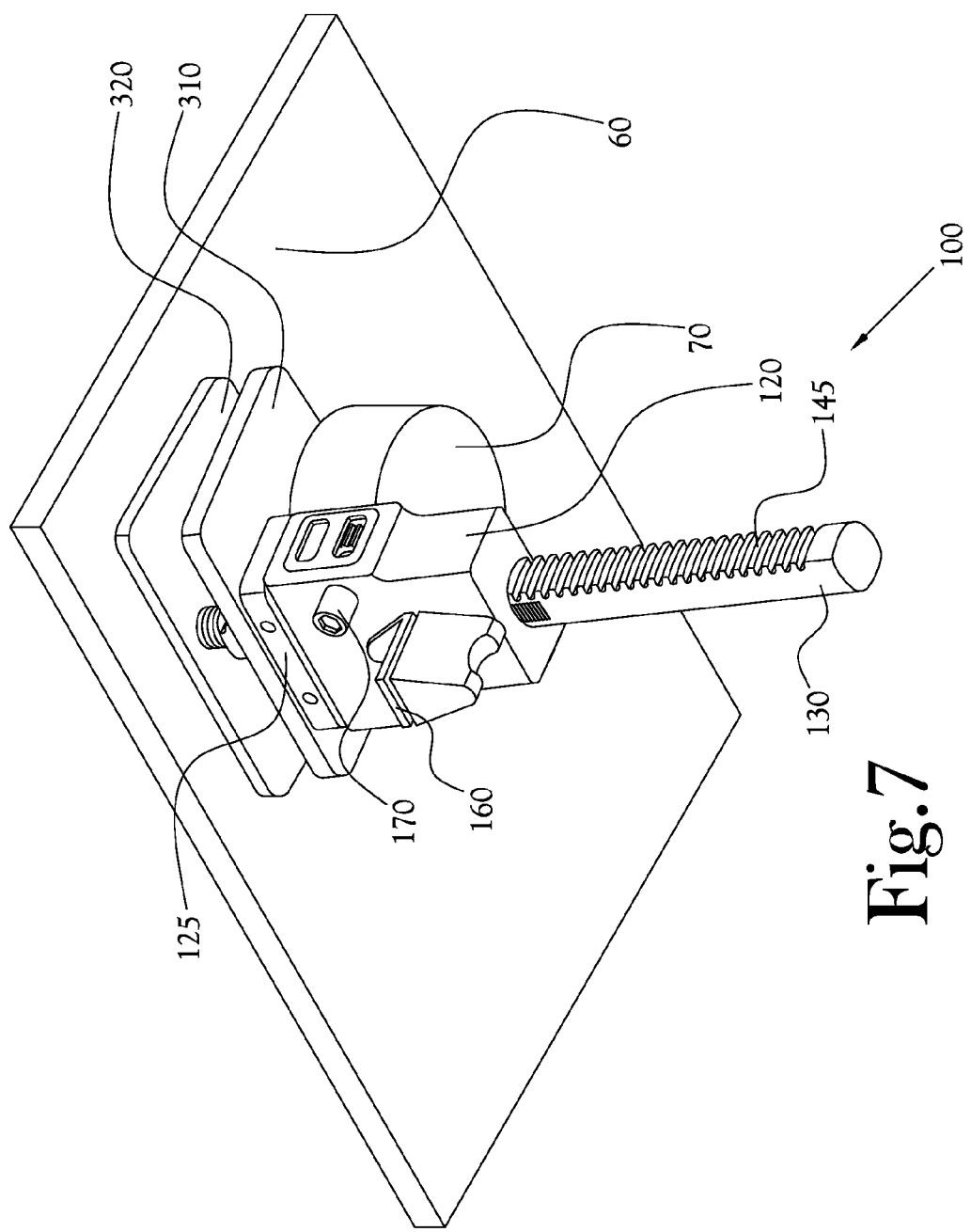
FIG. 7 is a perspective view of the embodiment of the multi-head rack and pinion driven pulley puller illustrated in FIG. 3 engaging a pulley from beneath a deck plate.

In accordance with one exemplary embodiment, a forked plate puller assembly 300 is provided. Forked plate puller assembly 300 includes a first fork plate member 310 releasably mounted on the head 125. It will be appreciated that first fork plate member 310 is releasably mounted to head 125, in the exemplary embodiment, by means of screws 180 which are received in threaded bore members 185. A second forked plate member 320 is carried by the upper end 135 of the rack shaft 130. In this regard, in an exemplary embodiment, a short shaft member 325 is disposed on the second fork plate member 320, substantially perpendicular to second fork plate member 320. Shaft member 325 is received by bore 140 disposed in the upper end 135 of shaft 130. In this regard, rack shaft 130 includes an axial bore member 140 disposed in the upper end 135 of the rack shaft 130. Actuation of the pinion gear 150 via the drive port 170 drives the rack shaft 130 forward biasing second forked plate member 320 away from the first forked plate member 310. As seen in FIG. 7, the second forked plate member 320 can be positioned against deck plate 60, while first forked plate member 310 engages lower pulley 70. This allows the pulley puller 100 to access the pulley 70 in minimal clearance areas where it may be difficult to engage the pulley 70 with a traditional pivoting jaw, jack-screw driven pulley puller.

Figure 8:
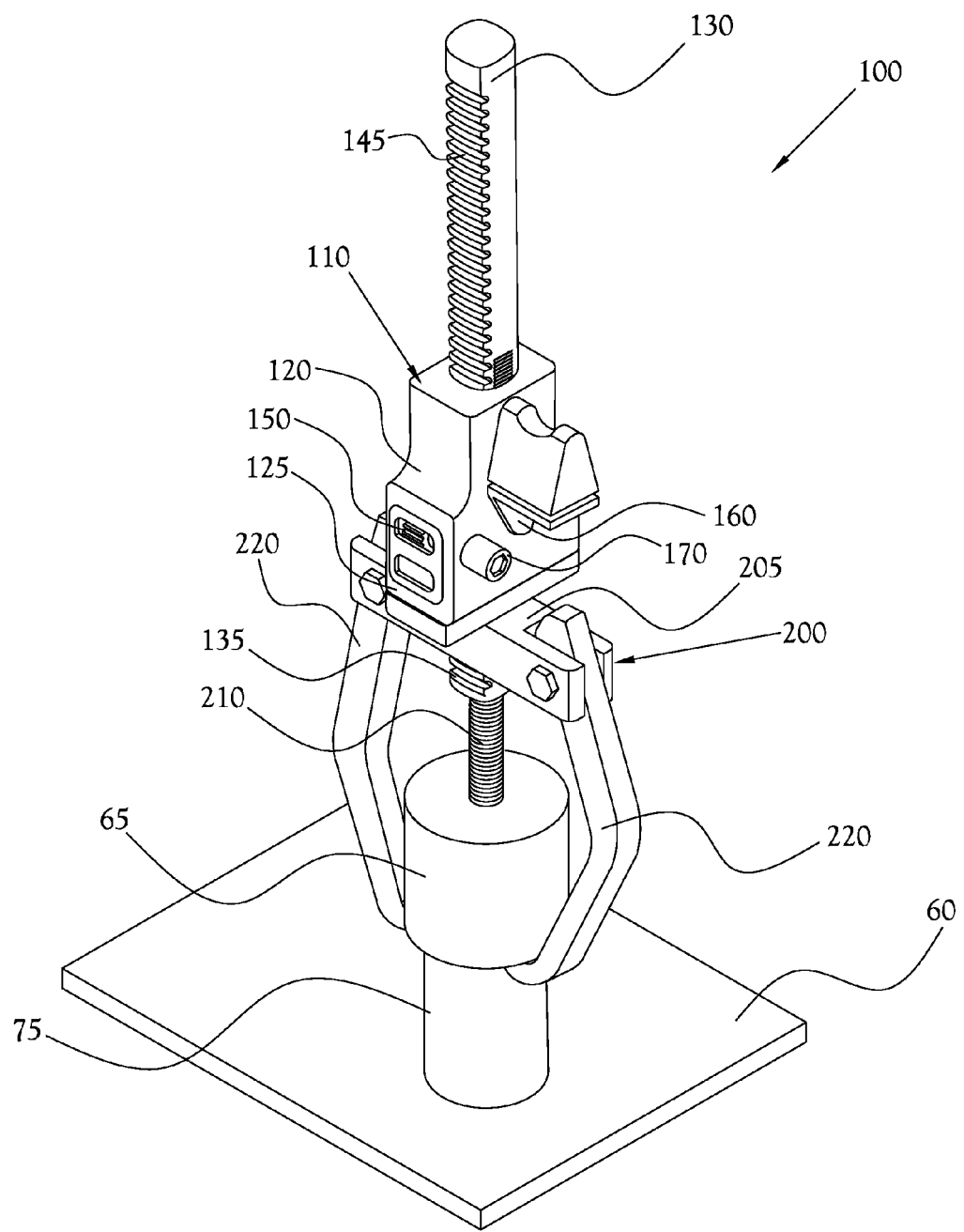
FIG. 8 is a perspective view of a further exemplary embodiment of the multi-head rack and pinion driven pulley puller engaging a pulley from above a deck plate.
Figure 9:
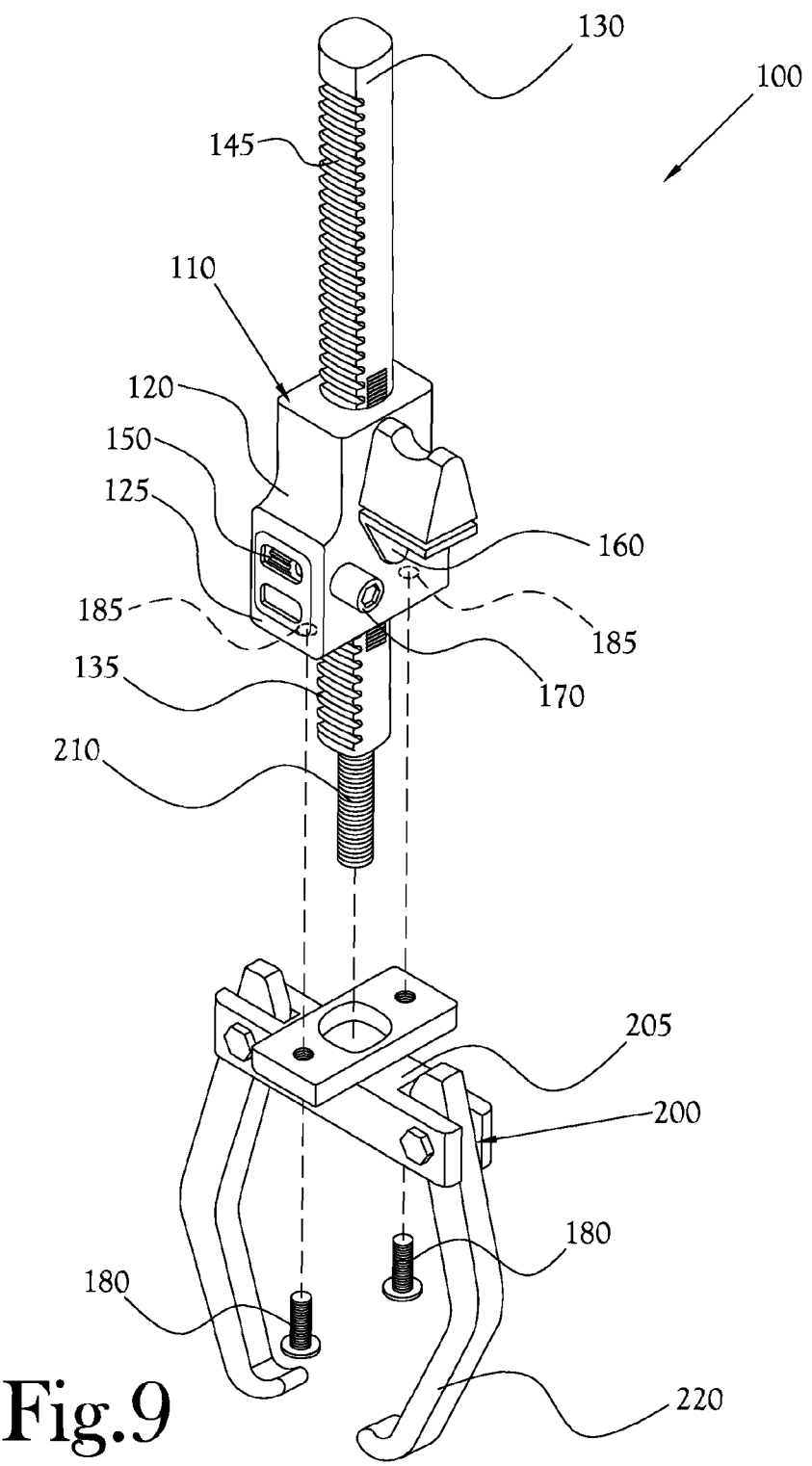
FIG. 9 is a partially exploded perspective view of the embodiment of the multi-head rack and pinion driven pulley puller illustrated in FIG. 8.

Pivoting jaw puller assembly 200, referred to above, is illustrated in FIGS. 8 and 9, the pivoting jaw puller assembly 200 consists of a base 205 adapted to be releasably mounted to the head 125 and a shaft extension 210 received by bore 140 disposed in the upper end 135 of the rack shaft 130. The pivoting jaw puller assembly 200 includes at least two pivoting jaw members 220 adapted to grasp a pulley as will be understood by those skilled in the art. Actuation of the pinion gear 150 via the drive port 170 drives the rack shaft 130 forward causing the shaft extension 210 to exert a force against a pulley shaft so as to separate the pulley from the shaft on which it is mounted. While the present invention has been described in terms of being a multi-head, rack and pinion driven pulley puller kit, it will be appreciated that the present invention could also be utilized as a rack and pinion driven pulley puller with a single, specific embodiment, pulley puller assembly.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A rack and pinion driven pulley puller, said rack and pinion driven pulley puller comprising:
    a rack and pinion drive assembly having a body, a rack shaft adapted to cooperate with said body, a pinion gear in geared cooperation with said rack shaft, and a head;
    a drive port adapted for providing a rotational force to said pinion gear; and
    a pulley puller assembly adapted to be secured to said head of said rack and pinion drive assembly, wherein said pulley puller assembly includes a base adapted to be removably secured to said body and at least a pair of jaw members pivotally secured to said base and a shaft extension releasably received by an axial bore disposed in an upper end of said rack shaft.

2. The rack and pinion driven pulley puller of claim 1 wherein said pinion gear is enclosed within said body.

3. The rack and pinion driven pulley puller of claim 2 wherein said pinion gear is actuated by a removable hex key.

4. The rack and pinion driven pulley puller of claim 2 wherein said pinion gear is actuated by a manually operated knob carried by said body of said rack and pinion drive assembly.

5. The rack and pinion driven pulley puller of claim 1 wherein said rack and pinion driven pulley puller defines a multi-head rack and pinion driven pulley puller adapted to receive a pulley puller assembly, and further wherein said pulley puller assembly is releasably secured to said head of said rack and pinion drive assembly.

6. The rack and pinion driven pulley puller of claim 1 wherein a rack and pinion drive assembly, and a plurality of pulley puller assemblies define a kit.

7. A rack and pinion driven pulley puller, said rack and pinion driven pulley puller comprising:
    a rack and pinion drive assembly having a body, a rack shaft adapted to cooperate with said body, a pinion gear in geared cooperation with said rack shaft, and a head;
    a drive port adapted for providing a rotational force to said pinion gear; and
    a pulley puller assembly adapted to be releasably secured to said head of said rack and pinion drive assembly, wherein said rack and pinion driven pulley puller defines a multi-head rack and pinion driven pulley puller adapted to receive a pulley puller assembly selected from a group consisting of a pivoting jaw puller assembly and a forked plate puller assembly.

8. The rack and pinion driven pulley puller of claim 7 wherein said pinion gear is enclosed within said body.

9. The rack and pinion driven pulley puller of claim 8 wherein said pinion gear is actuated by a removable hex key.

10. The rack and pinion driven pulley puller of claim 8 wherein said pinion gear is actuated by a manually operated knob carried by said body of said rack and pinion drive assembly.

11. The rack and pinion driven pulley puller of claim 7 wherein said pivoting jaw puller assembly includes a base adapted to be removably secured to said body and at least a pair of jaw members pivotally secured to said base.

12. The rack and pinion driven pulley puller of claim 7 wherein said pivoting jaw puller assembly further includes a shaft extension releasably received by an axial bore disposed in an upper end of said rack shaft.

13. The rack and pinion driven pulley puller of claim 7 wherein said forked plate puller assembly includes a first forked plate member adapted to be releasably secured to said head of said rack and pinion drive assembly and a second forked plate member adapted to be secured to an upper end of said rack shaft such that actuation of said pinion gear biases said second forked plate member away from said first forked plate member.

14. The rack and pinion driven pulley puller of claim 7 wherein a rack and pinion drive assembly, and a plurality of pulley puller assemblies define a kit.

15. A rack and pinion driven pulley puller, said rack and pinion driven pulley puller comprising:
    a rack and pinion drive assembly having a body, a rack shaft adapted to cooperate with said body, a pinion gear in geared cooperation with said rack shaft, and a head;
    a drive port adapted for providing a rotational force to said pinion gear; and
    a pulley puller assembly adapted to be releasably secured to said head of said rack and pinion drive assembly wherein said pulley puller assembly includes a first forked plate member adapted to be releasably secured to said head of said rack and pinion drive assembly and a second forked plate member adapted to be secured to an upper end of said rack shaft such that actuation of said pinion gear biases said second forked plate member away from said first forked plate member.

16. The rack and pinion driven pulley puller of claim 15 wherein said pinion gear is enclosed within said body and is actuated by a removable hex key.

17. The rack and pinion driven pulley puller of claim 15 wherein said pinion gear is enclosed within said body and is actuated by a manually operated knob carried by said body of said rack and pinion drive assembly.

* * * * *